United States Patent [19]

Burley

[11] Patent Number: 5,030,294
[45] Date of Patent: * Jul. 9, 1991

[54] HIGH-TEMPERATURE MINERAL-INSULATED METAL-SHEATHED CABLE

[75] Inventor: Noel A. Burley, Melbourne, Australia

[73] Assignee: Bell-IRH Limited, New South Wales, Australia

[*] Notice: The portion of the term of this patent subsequent to May 30, 2006 has been disclaimed.

[21] Appl. No.: 164,401

[22] Filed: Mar. 4, 1988

[30] Foreign Application Priority Data

May 20, 1987 [AU] Australia .................. PI2043

[51] Int. Cl.$^5$ ............................................ H01L 35/02
[52] U.S. Cl. .................................. 136/232; 136/230
[58] Field of Search .......................... 136/230–233

[56] References Cited

U.S. PATENT DOCUMENTS

| | | | |
|---|---|---|---|
| 2,815,283 | 12/1957 | Betteridge et al. | 75/171 |
| 3,238,025 | 3/1966 | Pendleton et al. | 29/194 |
| 3,539,400 | 11/1970 | Pustell et al. | 136/233 |
| 4,224,461 | 9/1980 | Snyder, Jr. et al. | 136/230 X |
| 4,491,822 | 1/1985 | Davis | 136/230 X |
| 4,834,807 | 5/1989 | Burley | 136/230 X |

FOREIGN PATENT DOCUMENTS 580244 11/1977 U.S.S.R. .

OTHER PUBLICATIONS

PCT application PCT/AU8700306 (WO 88/02106) International Publication date of Mar. 24, 1988, "Stable Metal-Sheathed Thermocouple Cable".

Primary Examiner—Peter A. Nelson
Attorney, Agent, or Firm—Armstrong, Nikaido, Marmelstein, Kubovcik & Murray

[57] ABSTRACT

A mineral-insulated metal sheathed cable comprising at least one type K thermoelement and characterized in that the sheath alloy is of the following composition:

| Element | Composition (wt. %) |
|---|---|
| Cr | 10 to 40 |
| Si | 0.3 to 5.0 |
| Mg | 0.5 maximum |
| Ce | 0.3 maximum |
| Mo | 20 maximum |
| W | 25 maximum |
| Nb | 10 maximum |
| Ta | 8.0 maximum |
| Ni | remainder, apart from impurities. |

11 Claims, 1 Drawing Sheet

HIGH-TEMPERATURE MINERAL-INSULATED METAL-SHEATHED CABLE

This invention relates to mineral-insulated integrally metal-sheathed electrically conductive cable.

The cable of this invention is suitable for use as thermocouple cable and is particularly useful at high temperature.

The invention utilizes nickel-base alloys as sheath alloys, which are used in conjunction with conventional standard nickel-base alloy thermocouples designated type K by various national standards bodies such as the American national Standards Institute, British Standards Institution, International Electrotechnical Commission, and other such bodies.

In one aspect the invention provides nickel-base thermocouple cables, and nickel-base thermocouple sensor systems made therefrom, having superior oxidation resistance, greater longevity and greater thermoelectric stability under longer time periods and over a range of higher temperatures up to about 1200° C., than existing type K base-metal cables and sensor systems of the same general kind.

Nickel-base alloys have been used as thermocouples since the early part of this century. The most commonly used thermocouple of this kind is the type K thermocouple. The properties of type K thermocouples are well-known, and are summarized in the following references:

(1) NBS Monograph 125 "thermocoupled Reference Tables based on the International Practical Temperature Scale (IPTS-69),", U.S. National Bureau of Standards, 1974. Column 1 on page 137 refers to compositional characteristics, while the thermal emf tables start at page 144.

(2) ASTM Annual Book of Standards, vol. 14.01 (1986): "Analytical Methods Spectroscopy; Chromatography; Temperature Measurement; Computerized Systems". This document alludes, on page 242, to the compositional characteristics referred to in reference (1) above, and starts the emf tables on page 268.

(3) ISA American National Standard for Temperature Measurement Thermocouples, Ref. MC96.1 (1975). This document, referred to in (2) above, discusses compositions in column 2 of page V and in Table 1, and presents emfs in Tables XV and XVI.

The type K thermocouple is recommended to be used in an air atmosphere. At the higher temperatures the type K thermocouple fails because of its relatively poor oxidation resistance. One way in which attempts have been made to overcome this problem is to incorporate the type K thermocouple in a compacted ceramic-insulated thermocouple sensor assembly.

As is well known in the art a first step in the manufacture of such thermocouple sensors is to produce the so-called MIMS (metal-sheathed mineral-insulated) cable which comprises a sheath containing one or more thermoelement conductor wires electrically insulated from the sheath (and each other when two or more conductor wires are used) by compacted mineral insulation material.

For a better understanding of the present invention together with other and further objects, advantages, and capabilities thereof, reference is made to the following disclosure, and to the accompanying drawings, in which.

Figure 1:
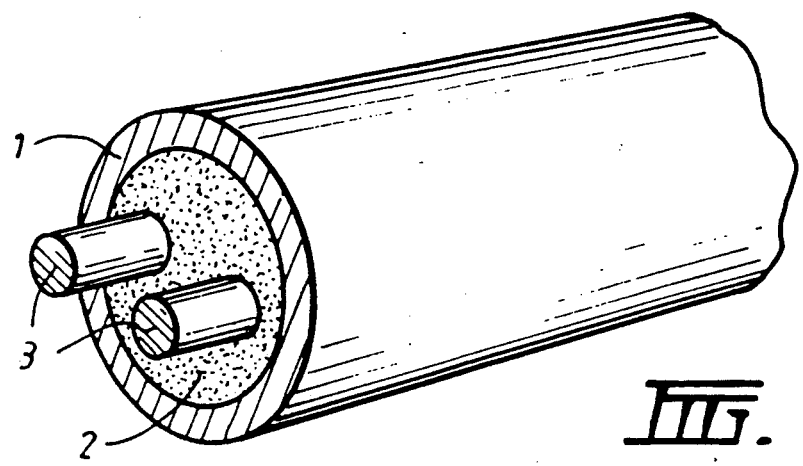
FIG. 1 represents a typical MIMS cable containing two conductor wires.

The structure of a typical conventional MIMS thermocouple is illustrated in FIG. 1, showing an integral sheath 1, usually made from stainless steel or Inconel, containing mineral insulation 2 which surrounds thermoelement conductor wires 3. The mineral insulation material is usually magnesium oxide, and the thermoelement wires are usually type K alloy.

To make an actual sensor from a MIMS cable, the cable is cut and the ends of the conductors are exposed by removing some of the insulation therefrom. The exposed ends of the conductors are then joined to form a thermojunction, which may be accomplished, for example, by crimping and/or welding.

The thermocouple may simply be left exposed for use in appropriate environments or may be protected by capping the sheath over the thermojunction with or without insulant.

The latter type of thermocouple has come into common use because of certain advantageous features, including (i) chemical isolation of thermocouple wires from environments that may cause rapid deterioration;

(ii) electrical isolation of thermoelement conductors from sources of interference that may cause spurious signals;

(iii) mechanical protection of thermocouple from damage due to pressure or shock;

(iv) mechanical flexibility of assembly, allowing bending in installation; and (v) simple fabrication of thermocouples.

The sheath can be made from a material which, hopefully, is compatible with the environments and processes in which it is being used. There are numerous commercial suppliers of type K thermocouples in the compacted integrally metal-sheathed ceramic-insulated forms.

Unfortunately, the full potential of the excellent MIMS design concept for type K thermocouples has not been realized. This is due to several factors associated with its development so far:

(i) The common sheath materials for type K MIMS thermocouples—the inconels and the stainless steels—will not withstand exposure in air for extended periods of time at much above 1050° C. Most manufacturers of conventional type K MIMS thermocouples prescribed 1100° C. as the maximum operating temperatures for their products. Unfortunately, in many instances in industrial pyrometry there are specified operating temperatures in the range above 1100° C. for which conventional type K MIMS thermocouples are quite unsuitable.

(ii) The type K thermoelement conductor wires can be contaminated by chemical elements which thermally diffuse through the compacted insulant material from dissimilar sheath alloys like stainless steel. It is known that particularly severe contamination is caused by manganese, which diffuses in the vapour-phase from the conventional sheath alloys stainless steel and inconel to both the positive and the negative type K thermoelements and from the negative to the positive thermoelements. The resultant change in the chemical compositions of the type K thermocouple alloys can cause substantial changes in their thermoelectromotive force. These changes in thermal emf are analogous with and algebraically additive to those caused by oxidation.

(iii) The type K thermoelement conductor wires, particularly the electronegative wire, may fail mechanically because of substantial alternating strains imposed during thermal cycling. These strains are caused primarily by longitudinal stresses which arise because of substantially different temperature coefficients of linear expansion of the thermoelements and stainless steel. Some typical values (average) of the coefficients of expansion are—

| Component | Material | $\times 10^{-6} \cdot {}^{\circ}C.^{-1}(1000^{\circ} C.)$ |
|---|---|---|
| sheath | stainless steel | 21 |
| thermoelements | type K | 17 |

As a result, there is a need for a new MIMS cable suitable for production of thermocouple sensors which are substantially free of the degradative influences described above and which demonstrate enhanced environmental and thermoelectric stability at temperatures significantly in excess of 1000° C.

It is believed, therefore, that a new integrally metal-sheathed mineral-insulated cable, substantially free of degradative influences such as differential thermal stresses, and cross-contamination by diffusion, and demonstrating enhanced resistance to environmental interactions and to drifts in thermal emf at temperatures up to 1200° C. in a variety of different atmospheres is an advancement in the art.

OBJECTS AND SUMMARY OF INVENTION

It is one of the objects of this invention to provide an integrally metal-sheathed mineral-insulated (MIMS) type K thermocouple cable and sensor which are thermoelectrically stable up to 1200° C. It is a further object of this invention to provide an integral compacted base-metal thermocouple cable and sensor which are highly oxidation resistant up to 1200° C.

These and other objects of this invention are achieved by the use of certain specific alloys, and certain other compositional variants of these alloys as MIMS sheath materials. These alloys are designed to be more oxidation resistant, stronger, more ductile and capable of continuous operation at much higher operating temperatures than the conventional MIMS sheath materials stainless steel and inconel.

In a general aspect the sheath alloys to be employed according to the present invention are of the following composition:—

| Element | Composition (wt. %) |
|---|---|
| Cr | 10 to 40 |
| Si | 0.3 to 5.0 |
| Mg | 0.5 maximum |
| Ce | 0.3 maximum |
| Mo | 20 maximum |
| W | 25 maximum |
| Nb | 10 maximum |
| Ta | 8.0 maximum |
| Ni | remainder, apart from impurities. |

A preferred special alloy is of the following composition:—

| Element | Composition (wt. %) |
|---|---|
| Cr | 14.0 ± 0.5 |
| Nb | 3.0 ± 1.5 |
| Si | 1.4 ± 0.1 |
| Mg | 0.15 ± 0.05 |
| Ce | 0.05 ± 0.05 |
| Ni | balance. |

Figure 2:
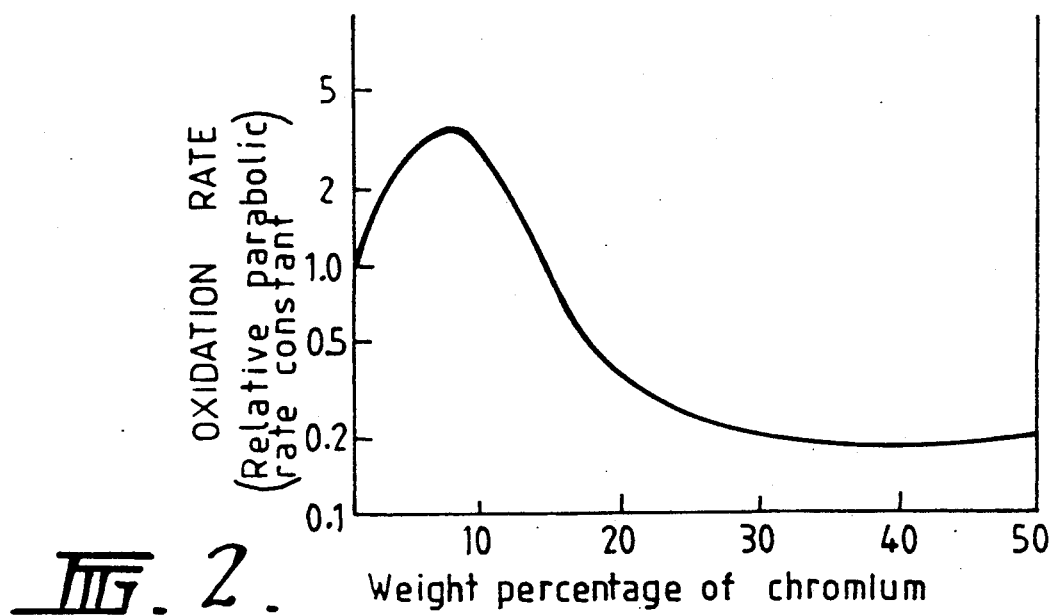
FIG. 2 represents the relative oxidation resistance of nickel-chromium binary alloys.

The said special preferred alloy is designed to have a single solid-solution base of Ni-Cr-Si which is strong and oxidation resistant. This inherent oxidation resistance is enhanced by the addition of certain critical trace-quantities of Mg and Ce and of the bulk quantity of Nb to this solid-solution structure. Nb also has a marked effect in increasing the high-temperature strength and ductility of the Ni-Cr-Si solid-solution base. Experimental measurements have shown that the oxidation resistance of the Ni-Cr-Si base is improved by increasing the chromium content, over a wide range of chromium concentrations, above the critical internal-to-external oxidation transition composition which is about 12 wt.-%. This is illustrated in FIG. 2. Thus the chromium content of the Ni-Cr-Si base can be broadened to cover the range 10 to 40 wt.-% Cr. Similar considerations apply to the silicon content of the Ni-Cr-Si base, so that the silicon concentration can be broadened to cover the range 0.5 to 5.0 wt.-% Si.

The desired effect of strengthening at high temperatures can, in fact, be achieved by a number of optional strengthening elements whose effect on the single solid-solution structure is similar to that of Nb. The solid-solution strengthening effects of the optional elements tungsten, vanadium and molybdenum are efficaceous over the whole range of solid solubility in the Ni-Cr-Si base of each of these elements, respectively, so that their concentrations in the base alloy can cover quite broad compositional ranges. The preferred embodiments of a range of possible optional alloys is set down in Table 1.

TABLE 1

| Component Element | Alloy Option (composition - wt. %) | | | | | |
|---|---|---|---|---|---|---|
| | 1 | 2 | 3 | 4 | 5 | 6 |
| Cr | ← | ← | 10 to 40 | → | → | → |
| Si | ← | ← | 0.5 to 5 | → | → | → |
| Mg | ← | ← | 0.2 maximum | → | → | → |
| Ce | ← | ← | 0.1 maximum | → | → | → |
| Mo | 1.0 to 20 | — | — | — | 1.0 | 3.0 |
| W | — | 0.5 to 25 | — | — | 0.5 | 1.0 |
| Nb | — | — | 1.0 to 10 | — | 1.0 | — |
| Ta | — | — | — | 0.5 to 8 | 1.0 | — |
| Ni | ← | ← | balance | → | → | → |

The compositions of the alloys in the present invention require the careful selection of component elements of very high purity and the achievement of correct proportions of each by adequate control of melting and casting techniques. In all cases the effects of one component element depend on those of the others and hence there is an interdependence of the elements within the overall composition. Thus the strengthening elements Mo, W, Nb, and Ta, when added to the preferred base alloy of the Ni-Cr-Si, in any combination, have effects one with another as stated above.

Alloys of this invention may therefore be compositionally variant in respect of the Mo, W, Nb, and Ta contents to a greater degree than is indicated by the preferred embodiments described in Table 1. The limits of these variants are set out in the general aspect of the invention disclosed above.

It is desirable, but not essential, that the type K thermocouples employed in this invention should be devoid of manganese in their chemical compositions. Such manganese-free varieties of type K thermocouple alloys are readily commercially available. This usage would obviate the damaging cross-contamination by manganese, between individual electropositive and electronegative thermoelements, which plagues type K MIMS thermocouples of conventional design.

The invention will be illustrated by the following non-limiting Example.

EXAMPLE 1

The integral compacted thermocouple cable of this Example is fabricated using existing manufacturing procedures. They begin with thermoelectrically matched thermoelement wires surrounded by non-compacted ceramic insulating material held within a metal tube. By rolling, drawing, swageing, or other mechanical reduction process the tube is reduced in diameter and the insulation is compacted around the wires. The manufacturing process parameters are adjusted so that the ratios of sheath diameter to wire-size and sheath wall-thickness offer a balance between maximum wall-thickness and suitable insulation spacing for effective insulation resistance at elevated temperatures.

An important feature of the fabrication process is that considerable attention is given to the initial cleanliness and chemical purity of the components and retention of a high degree of cleanliness and dryness throughout fabrication. As already noted above, to make an actual sensor from this cable, the cable is cut and the ends of the conductors are exposed by removing some of the insulation therefrom. The exposed ends of the conductors are then joined to form a thermojunction, which may be accomplished for example by crimping and/or welding.

The thermojunction may simply be left exposed for use in appropriate environments, or may be protected by capping the sheath over the thermojunction with or without insulant. The measuring thermojunction of the thermocouple is usually, but not always, electrically isolated from the end of the sheath.

In this example, the alloys for the thermocouple conductor wires are those specified above as type K and the alloy for the sheath is that specified above as:—

| | |
|---|---|
| Cr | 14.0 wt. % |
| Nb | 3.0 |
| Si | 1.4 |
| Mg | 0.15 |
| Ce | 0.05 |

An important feature of the finished product of this example is that the essential similarity between the composition and high-temperature properties of the sheath alloy and the thermocouple conductor alloys substantially attenuates the destructive influences of thermocouple contamination by cross-diffusion, mechanical (fatigue) failure due to differential thermal stresses, and accelerated oxidation above about 1000° C. which occur when dissimilar and inappropriate sheath alloys like the stainless steels are used.

The strains caused by longitudinal stresses arising during thermal cycling, which cause mechanical failure, are reduced by about an order of magnitude because of the very small differences in temperature coefficient of lineal expansion between the materials of the sheath of this invention and of the type K thermoelement conductors.

Some typical values of these coefficients of expansion are:—

| Component | Material | $\times 10^{-6} \cdot °C.^{-1}$ (1200° C.) |
|---|---|---|
| sheath | Ni—14.0Cr—1.4Si—3.0Nb —0.15Mg—0.05Ce | 17.5 |
| thermoalloys | type K | 17 (average of positive and negative alloy) |

It will be clearly understood that the invention in its general aspects is not limited to the specific details referred to hereinabove.

The claims defining the invention are as follows:

1. A mineral-insulated metal sheathed cable comprising at least one type K thermoelement and the sheath alloy composition consists essentially of:

| Element | Composition (wt. %) |
|---|---|
| Cr | 10 to 40 |
| Si | 0.3 to 5.0 |
| Mg | 0.5 maximum |
| Ce | 0.3 maximum |
| Mo | 20 maximum |
| W | 25 maximum |
| Nb | 10 maximum |
| Ta | 8.0 maximum |
| Ni | remainder, apart from impurities. |

2. A cable according to claim 1 in which the sheath alloy consists of essentially of:

| Element | Composition (wt. %) |
|---|---|
| Cr | 14.0 ± 0.5 |
| Nb | 3.0 ± 1.5 |
| Si | 1.4 ± 0.1 |
| Mg | 0.15 ± 0.05 |
| Ce | 0.05 ± 0.05 |
| Ni | balance. |

3. A cable according to claim 1 in which the sheath alloy consists essentially of from 10 to 40 weight percent chromium, from 0.5 to 5 weight percent silicon, up to 0.2 weight percent magnesium, up to 0.1 weight percent cerium, from 1.0 to 20 weight percent molybdenum, and the balance nickel.

4. A cable according to claim 1 in which the sheath alloy consists essentially of from 10 to 40 weight percent chromium, from 0.5 to 5 weight percent silicon, up to 0.2 from 0.5 to 25 weight percent tungsten, and the balance nickel.

5. A cable according to claim 1 in which the sheath alloy consists essentially of from 10 to 40 weight percent chromium, from 0.5 to 5 weight percent silicon, up to 0.2 weight percent magnesium, up to 0.1 weight percent cerium, from 1.0 to 10 weight percent niobium, and the balance nickel.

6. A cable according to claim 1 in which the sheath alloy consists essentially of from 10 to 40 weight percent chromium, from 0.5 to 5 weight percent silicon, up to 0.2 weight percent magnesium, up to 0.1 weight percent cerium, from 0.5 to 8 weight percent tantalum, and the balance nickel.

7. A cable according to claim 1 in which the sheath alloy consists essentially of from 10 to 40 weight percent chromium, from 0.5 to 5 weight percent silicon, up to 0.2 weight percent magnesium, up to 0.1 weight percent cerium, 3.0 weight percent molybdenum, 1.0 weight percent tungsten, and the balance nickel.

8. A cable according to claim 1 in which the sheath alloy consists essentially of from 10 to 40 weight percent chromium, from 0.5 to 5 weight percent silicon, up to 0.2 weight percent magnesium, up to 0.1 weight percent cerium, 1.0 weight percent molybdenum, 0.5 weight percent tungsten, 1.0 weight percent niobium, 1.0 weight percent tantalum, and the balance nickel.

9. A cable according to any one of the preceding claims in which the type K thermoelement does not contain manganese.

10. A cable according to claim 1 in which the mineral insulating material is selected from the group consisting of magnesium oxide, beryllium oxide and aluminum oxide.

11. A cable according to claim 1 or 10 in which air in the mineral insulation is replaced by an inert gas.

* * * * *

UNITED STATES PATENT AND TRADEMARK OFFICE
CERTIFICATE OF CORRECTION

PATENT NO. : 5,030,294
DATED : July 9, 1991
INVENTOR(S) : BURLEY

It is certified that error appears in the above-identified patent and that said Letters Patent is hereby corrected as shown below:

On the cover page, item [57], line 1, delete "metal sheathed" and substitute therefor --metal-sheathed--;

Col. 1, line 14, delete "national" and substitute therefor --National--;

Col. 1, line 31, delete "thermocoupled" and substitute therefor --Thermocouple--;

Col. 2, line 11, delete "alloy" and substitute therefor --alloys;

Col. 6, line 64, after "0.2" please insert --weight percent--.

Signed and Sealed this

First Day of June, 1993

Attest:

MICHAEL K. KIRK

*Attesting Officer*  Acting Commissioner of Patents and Trademarks

UNITED STATES PATENT AND TRADEMARK OFFICE
CERTIFICATE OF CORRECTION

PATENT NO. : 5,030,294
DATED : July 9, 1991
INVENTOR(S) : Noel A. Burley

It is certified that error appears in the above-indentified patent and that said Letters Patent is hereby corrected as shown below:

Col. 6, line 64, after "percent " please insert -- magesium, up to 0.1 weight percent cerium,--.

Signed and Sealed this

Twentieth Day of December, 1994

Attest:

BRUCE LEHMAN

Attesting Officer    Commissioner of Patents and Trademarks